H. R. CANFIELD.
ELECTROMAGNETIC DEVICE.
APPLICATION FILED APR. 22, 1916.
1,293,698.
Patented Feb. 11, 1919.
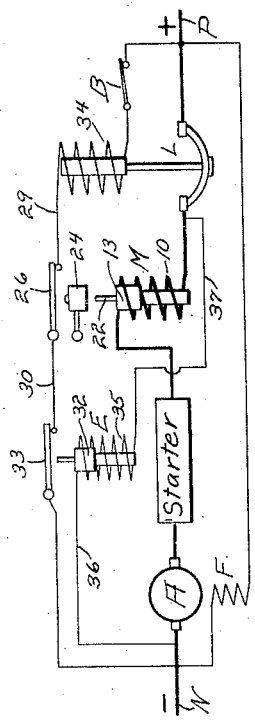
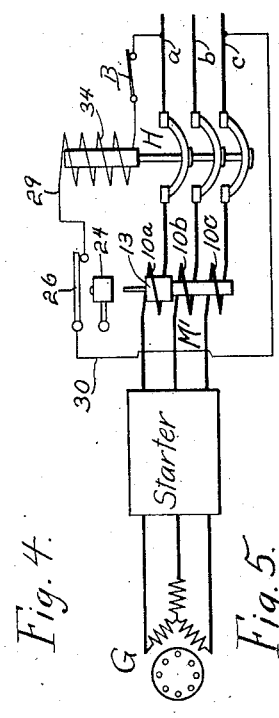
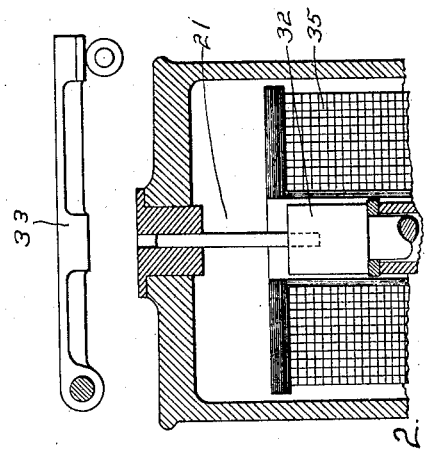
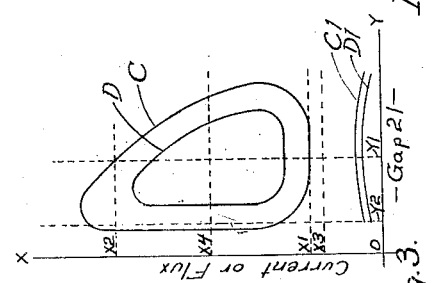
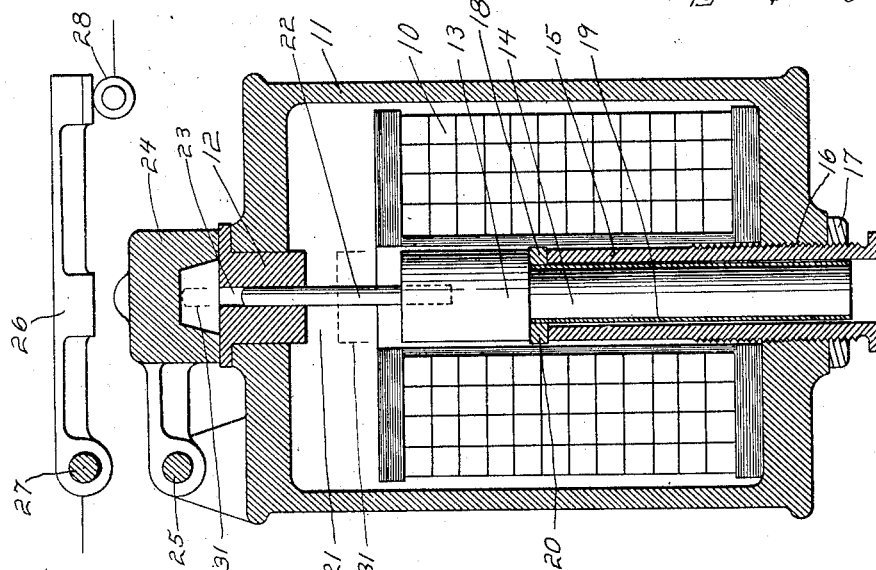
INVENTOR.
Harry R. Canfield
BY
ATTORNEY.

UNITED STATES PATENT OFFICE.

HARRY R. CANFIELD, OF CLEVELAND, OHIO, ASSIGNOR TO THE ELECTRIC CONTROLLER & MANUFACTURING COMPANY, OF CLEVELAND, OHIO, A CORPORATION OF OHIO.

ELECTROMAGNETIC DEVICE.

1,293,698.  Specification of Letters Patent.  Patented Feb. 11, 1919.

Application filed April 22, 1916. Serial No. 92,857.

*To all whom it may concern:*

Be it known that I, HARRY R. CANFIELD, a citizen of the United States, residing at Cleveland, in the county of Cuyahoga and State of Ohio, have invented new and useful Improvements in Electromagnetic Devices, of which the following is a specification.

This invention relates to electromagnetic devices.

The principal object of this invention is to provide an electromagnetic device adaptable for such uses as operating a switch or the like, and having such characteristics of operation that, when current in the energizing winding is above a predetermined value and below a predetermined higher value, the movable parts of the device will be magnetically held or locked in their normal position; but when the current in the winding is below the said predetermined lower value or above the said predetermined higher value, the movable parts will move and the device will operate.

Another object of this invention is to provide an electromagnetic device having such characteristics of operation that, when the current in the energizing winding is above a predetermined value and below a predetermined higher value, the movable parts of the device will be magnetically held or locked in their normal or unoperated position; and, when the current is above the said predetermined higher value, will move to their fully operated position, and so constructed that, when the current in the energizing winding is below the said predetermined lower value, the device will undergo a change of characteristics, so that thereafter, if the winding is energized with current larger than a third predetermined value, the parts will move to their fully operated position.

Another object of this invention is to provide an electromagnetic device, the winding of which may be energized from all three of the phases of a three-phase alternating current system in a manner to give zero flux when the three-phase system is perfectly balanced, and having such characteristics of operation that, if the system becomes unbalanced, the resultant flux, if above a predetermined value and below a predetermined higher value, will magnetically hold or lock the movable parts of the device in their normal or unoperated position; and when the resultant flux is above the predetermined higher value the parts will move to their fully operated position; and when the resultant flux is below said predetermined lower value, the parts will either move to the fully operated position or the device will undergo a change of characteristics such that, if thereafter the resultant flux due to an unbalanced condition becomes greater than a third predetermined amount, the parts will move to their fully operated position.

In view of the practical uses for a device having the characteristics set forth above, it is a further object of this invention to provide an electromagnetic voltage relay, the winding of which may be connected across the supply mains of an electric circuit so that the energizing current in the winding will be proportional to the voltage of the circuit, the relay having such characteristics that, when the voltage is below a certain predetermined value and above a certain predetermined higher value, the moving parts of the device will be held or locked in their normal or unoperated position; and when the voltage rises above the said predetermined higher value or falls below the said predetermined lower value, the movable parts will move and perform some such function as actuating a regulating device or opening a circuit-breaker.

A further object of this invention is to provide an overload device to be used in electric motor-control circuits, which will be held or locked in its normal or unoperated position when energized by large motor-starting currents during the starting of a motor unless the starting current becomes dangerously large, in which case the device will operate to open the motor circuit, and which, when the starting operation is complete and the motor current falls to the running value, will undergo a change of characteristics such that thereafter on an overload, even if less in amount than the previous starting currents, will operate to open the motor circuit.

A further object of this invention is to provide an electromagnetic phase-balance relay which may be used in a three-phase alternating current motor-control circuit, the device having such characteristics that, if, during the starting of the motor, the system is unbalanced, the movable parts of the relay will be held or locked in their unoperated position unless the system is unbalanced to an excessive and dangerous degree, whereupon the relay will operate to open the circuit; and that if, after the motor-starting operation is complete, the system is or becomes unbalanced to a predetermined degree, the relay will open the circuit-breaker, but, for a permissible degree of unbalanced condition at any time, will remain in its unoperated position.

Other objects will appear in the following description of my invention.

Referring to the accompanying drawing, Figure 1 is a view, partly in cross section and partly in elevation, showing one form of my invention adapted to operate a switch; Fig. 2, a view similar to Fig. 1, showing the upper portion of another form of my invention; Fig. 3, a set of coördinate curves, showing graphically the values of current or flux for corresponding adjustments of my invention at which its characteristics appear; Fig. 4, a diagram of connections of a motor-control system embodying two forms of my invention for two different purposes in connection with direct current; and Fig. 5, a diagram of connections of a motor-control system employing my invention for another purpose in connection with three-phase alternating current.

Referring to Fig. 1, 10 is a winding which, when supplied with current, energizes a magnetic circuit consisting of a main frame 11, a stationary upper pole-piece 12 which may be removable for assembling and inspection purposes, a vertically-movable core-armature 13 having a tail-piece 14, and a hollow pole-piece 15. The pole-piece 15 is adjustable in the bottom of the main frame 11 by the threads 16 and has a lock-nut 17 by which its position may be fixed. The armature 13 rests on a non-magnetic washer 18 which in turn is supported on the top of the hollow pole-piece 15. The tail-piece has a tight fitting brass sleeve 19 which fits loosely in the bore of the pole-piece 15 and moves vertically with the armature. A gap 20 is thus provided, filled by the non-magnetic washer 18, and a working gap 21 is also provided between the pole-piece 12 and the armature 13. The armature 13 has in the upper end thereof a stem 22, which extends into a bore 23 in the pole-piece 12 and guides the movement of the armature. A weight 24 pivoted to the main frame 11 at 25 rests on the pole-piece 12, and a switch-arm 26, pivoted at 27, rests on a stationary contact 28.

When the winding 10 is energized with current of a value to be described hereinafter, the flux in the gap 21 raises the armature 13, causing the stem 22 to engage the weight 24 and lift it, thereby causing the weight 24 to engage and raise the arm 26 from the contact 28.

Devices having magnetic circuits similar to that just described are shown in my application Serial No. 583,000, filed September 21, 1910 and in Eastwood's Patent, No. 1,040,292, issued October 8, 1912, and are in such extensive use that it is not considered necessary in the present application to describe the magnetic circuit of Fig. 1 except so far as it differs from those just referred to.

Heretofore, it has been customary to maintain the gap 21 of constant length and to vary the length of the gap 18 by adjustment of the hollow pole-piece 15 for changing at will the operating current values of the device. In the present application the gap 20 is maintained of constant length by means of the washer 18, and the length of the gap 21 is varied by adjusting the position of the hollow pole-piece 15, and an altogether novel set of operating characteristic is thus obtained, which will now be described.

Referring to Fig. 3, the abscissæ represent lengths of the gap 21 at different adjustments of the pole-piece 15, and the ordinates represent values of current in the winding 10 or values of flux in the magnetic circuit. When the winding is excited with current of such value and with the gap 21 of such size that a point is determined within the curve C, the magnetic pull in the gap 20 predominates over the magnetic pull in the gap 21 and the armature 13 is held or locked in its normal position. When the current and the adjustment of the gap 21 determine a point outside the curve C, the pull in the gap 21 predominates over that in the gap 20 and the armature 13 moves upwardly. If the current is sufficiently large when the armature 13 thus moves upwardly, the pull in the gap 21 will lift the armature 13 through its full stroke and raise the weight 24 and the switch-arm 26; but if the current is not so large, the pull in the gap 21 may be sufficient to lift the armature 13 and the stem 22 only to an intermediate or partially-operated position, shown in dotted lines at 31, at which position the stem 22 engages the weight 24, the pull being insufficient to lift the weight 24.

The curve $C^1$ represents the least current outside the curve C, capable of raising the armature 13 to the intermediate position. These curves are obtained by exciting the winding 10 with all values of current and at all adjustments of the gap 21 for a given size of the gap 20, such as that shown in Fig. 1. The curves D and $D^1$ are exactly similar curves to the curves C and $C^1$, respectively, and were obtained with the same parts with the gap 18 larger.

The operation of the device will now be described for one fixed adjustment. Assume that the gap 21 is adjusted to the size shown in the drawing, Fig. 1, and represented in Fig. 3 by the distance $OY^1$, the gap 20 being of the size shown in Fig. 1. If the winding 10 be energized with current greater than $OX^1$, but not greater with $OX^2$, the armature will be locked in its normal position. However, if the energizing current be less than $OX^1$, say, $OX^3$, the armature 13 will move upward to the intermediate or partially operated position, shown at 31, Fig. 1, and if the energizing current be greater than $OX^2$, the armature 13 will move from its normal position to its fully operated position, lifting the weight 24 and raising the arm 26. If, after energizing the winding with current between $OX^1$ and $OX^2$, the current falls to the value, say, $OX^3$, or if the winding be initially excited with current of the value $OX^3$ and the armature 13 moves up to the intermediate position, the gap 20 will be increased thereby by an amount equal to the movement of the armature, so that the curves D and $D^1$ will then be the characteristic curves of the magnetic circuit. With the armature then in the intermediate position, the gap 21 will be of the value $OY^2$, and it will be apparent from Fig. 3 that, if now the current in the winding be raised, it will determine points to the left of and therefore outside of the curve D; that, therefore, the pull in the gap 21 will predominate over the pull in the gap 20 at all values of the current; and that at some value of current greater than $OX^3$, such say, as $OX^4$, the pull in the gap 21 will be sufficient to lift the weight 24 and raise the arm 26. The value $OX^4$ will depend upon the mass of the weight 24.

In Fig. 2, I show a modification of the device of Fig. 1, the weight 24 being omitted. Therefore, in this form with the gap 21 of the size $OY^1$, current between $OX^2$ and $OX^1$ will lock the armature 32 in the normal position, and current above $OX^2$, or below $OX^1$ but above $C^1$ will move the armature 32 to the fully operated position and raise the switch-arm 33.

To illustrate the practical application of this invention, one use to which it may be put in connection with a direct-current motor-control system will now be described. Referring to Fig. 4, A is the armature of a motor and F its field winding. L is an electromagnetic line-switch actuated by a solenoid 34 and controlled by a switch B. The "starter" may be of any suitable form to maintain the starting current within predetermined limits. M is the magnetic device shown in Fig. 1 having the winding 10 in series with the motor armature, the armature 13, the weight 24, and the switch-arm 26. On the closure of the switch B the solenoid 34 is energized, the current flowing from the positive main P through the switch B, the solenoid 34, the wire 29, the switch-arm 26, the wire 30, and the switch-arm 33 to the negative main N. The current in the winding 34 causes the switch $l$ to close its contacts. Current then flows to the armature A from the positive main P through the contacts of the switch L, the winding 10, the "starter," and the armature A to the negative main N. The starting current of the motor is maintained at values between $OX^1$ and $OX^2$ of Fig. 3, and, therefore, locks open the switch M during starting. After the acceleration of the motor is complete, and the motor-current falls to the running value, say $OX^3$, the armature 13 moves upward to the intermediate position, the stem 22 engaging the weight 24. At any subsequent time, if an overload occurs on the motor of the value $OX^4$, or greater, the armature 13 will lift the weight 24 and the arm 26, thereby opening the circuit through the solenoid 34 and causing the opening of the line switch L. An overload device is thus provided which will not be operated by the starting current but which will, after starting, operate on overloads even if they are smaller than the starting current.

Another application of this invention is illustrated also in Fig. 4. E indicates the device of Fig. 2, having the armature 32, the switch arm 33 and the winding 35. The winding 35 is a shunt winding and is connected by the wires 36 and 37 across the positive and negative supply mains P and N, whereby the energization of the winding 35 is proportional to the voltage of the supply mains. The switch-arm 33 is in series with the arm 26, and, therefore, controls the solenoid 34. At normal voltages the flux in the device E, due to the winding 35, will be between $OX^1$ and $OX^2$, Fig. 3, and, therefore, the armature 32 of the device E will be held or locked in its normal or unoperated position. If the voltage rises or falls so as to give flux greater than $OX^1$ or less than $OX^2$, say $OX^3$, the armature 32 will move upward and raise the switch-arm 33, thereby opening the circuit through the solenoid 34 and causing the line switch L to open. Thus, this invention provides a voltage-relay which remains inoperative when the voltage on the main circuit is between predetermined limits, but which operates to open the main circuit when the voltage rises above or falls below the said limits.

Another application of this invention is shown in Fig. 5, in connection with a polyphase alternating current motor-control system. In alternating current practice the several phases of a polyphase system are not always in balanced condition. During the starting of an induction motor the system will sometimes become unbalanced to a great degree. It is, therefore, desirable to provide means in a polyphase motor control system which will not be responsive to unbalanced conditions during starting unless they are exceedingly severe, but which will respond to unbalanced conditions of comparatively small degree after the motor has been started. This invention provides such means in the following manner. Referring to Fig. 5, a, b, and c are the three supply mains of a three-phase alternating current system, and G is a three-phase induction motor. H is a three-pole line switch actuated by the solenoid 34 and controlled by the switch B. The "starter" may be of any suitable form, such as the auto-transformer type, to limit the starting current. $M^1$ is the device of Fig. 1 but having three energizing windings $10^a$, $10^b$ and $10^c$, connected in series with the supply mains a, b, and c, respectively, and so arranged as to polarity that when they are all equally energized their resulting flux will be zero. The armature 13, the weight 24, the switch-arm 26, and the wires 29 and 30 are the same as in Figs. 1 and 4.

To start the motor, the switch B is closed and current flows from the supply main a through the switch B, the solenoid 34, the wire 29, the switch-arm 26, and the wire 30 to the main c, energizing the solenoid 34 and causing the line switch H to close. Main current now flows from the three supply mains a, b, and c, through the switch H, the windings $10^a$, $10^b$, and $10^c$, and the "starter" to the motor G. If during the starting operation of the motor the circuits are perfectly balanced, the energization of the three windings of the device $M^1$ will exactly neutralize each other, giving zero flux in the magnetic circuit; if the system is slightly unbalanced, there will be a corresponding amount of resultant flux in the magnetic circuit, say, of value $OX^3$, whereupon the armature 13 will move to its intermediate position. If, at any subsequent time, the unbalance becomes undesirably great, the resultant flux will increase to the value, say, of $OX^4$, and the armature 13 will lift the weight 24 and raise the arm 26, thereby causing the line switch H to open. If, however, due to starting the motor, the degree of unbalance is quite large, and the resultant flux in the magnetic circuit is of a value between $OX^1$ and $OX^2$, the device $M^1$ will remain inoperative during the starting of the motor. After the starting of the motor is complete and the degree of unbalance becomes less, the resultant flux will drop below $OX^1$, say, to $OX^3$, and the armature 13 will move to the intermediate position. If, however, in starting the motor, the degree of unbalance is excessive, the resultant flux will be greater than $OX^2$ and will lift the armature 13 at once to the fully operated position and cause the line switch H to open. The values $OX^1$ and $OX^2$ can be selected by adjustment of the gap 21 so that, if the unbalance after the motor has been started does not give flux less than $OX^1$, then it will during starting give a flux greater than $OX^2$, so that under all circumstances the device will either operate fully, opening the line switch at once, or will move to the intermediate position.

It is apparent from the foregoing that the practice of the invention as illustrated in connection with Fig. 3 for direct current may also be carried out with alternating current, and that other applications of the invention may be made other than those shown in Figs. 3 and 4. It is also apparent that the weight 24 may be made adjustable by well-known means, and that other changes and modifications may be made without departing from the spirit of my invention or sacrificing any of its advantages.

I claim:—

1. In an electromagnetic device, a winding, a movable member, and means whereby the movable member is influenced by current in the winding to move from a given position only when the current is above a predetermined value and below a predetermined lower value.

2. In an electromagnetic device, a winding, a movable member, and means whereby the movable member is influenced by current in the winding to be held in its normal position when the current in the winding is below a predetermined value and above a predetermined lower value.

3. In an electromagnetic device, a winding, a movable member, and means whereby the movable member is influenced by current in the winding to be held in its normal position when the current in the winding is below a predetermined value and above a predetermined lower value and to move when the current in the winding is above the said predetermined higher value and below the said predetermined lower value.

4. In an electromagnetic device, a winding, a movable member influenced by current in the winding to move when the current is above a predetermined value, and means whereby, when the winding has been energized with current below a predetermined lower value, the value of current necessary to move the said member will change.

5. In an electromagnetic device, a winding, a movable member influenced by current in the winding to be held in its normal position when the current is below a predetermined value and above a predetermined lower value and to move when the current is above the predetermined higher value, and means whereby, when the winding has been energized with current below the said predetermined lower value, the value of current necessary to move the said member will change.

6. In an electromagnetic device, a winding, a movable member having normal, partly operated, and fully operated positions, and means whereby the member is influenced by current in the winding to remain in its normal position when the current is below a predetermined value and above a predetermined lower value, to move to its fully operated position when the current is above the said predetermined higher value and to move to its partially operated position when the current is below the said predetermined lower value.

7. In an electromagnetic device, a winding, a movable member having normal, partly operated, and fully operated positions, and means whereby the member is influenced by current in the winding to remain in its normal position when the current is below a predetermined value and above a predetermined lower value, to move to its fully operated position when the current is above the said predetermined higher value and to move to its partially operated position when the current is below the said predetermined lower value and to move from its partially operated position to its fully operated position when the current in the winding is at a third predetermined value.

8. In an electromagnetic switch, contacts, a winding, a movable member, and means whereby the movable member is influenced by current in the winding to move and operate the contacts when the current is above a predetermined value and below a predetermined lower value.

9. In an electromagnetic switch, contacts, a winding, a movable member, and means whereby the movable member is influenced by current in the winding to move and operate the contacts when the current is above a predetermined value and to be held in its normal position when the current is below the said value and above a predetermined lower value, and means whereby, when the current is below the predetermined lower value, the predetermined higher value will change.

Signed at Cleveland, Ohio, this 20th day of April, A. D. 1916.

HARRY R. CANFIELD.

Copies of this patent may be obtained for five cents each, by addressing the "Commissioner of Patents, Washington, D. C."